United States Patent
Perilla et al.

(10) Patent No.: US 11,020,922 B2
(45) Date of Patent: Jun. 1, 2021

(54) FOOTWEAR WITH PADDING AND MIDSOLE STRUCTURES AND THE METHOD OF MAKING THE SAME

(71) Applicant: adidas AG, Herzogenaurach (DE)

(72) Inventors: Andrea Nieto Perilla, Portland, OR (US); Andrew Joseph Leslie, Portland, OR (US); Eric Webring, Portland, OR (US)

(73) Assignee: adidas AG, Herzogenaurach (DE)

( * ) Notice: Subject to any disclaimer, the term of this patent is extended or adjusted under 35 U.S.C. 154(b) by 249 days.

(21) Appl. No.: 16/047,687

(22) Filed: Jul. 27, 2018

(65) Prior Publication Data

US 2020/0031072 A1  Jan. 30, 2020

(51) Int. Cl.
| | |
|---|---|
| *B29D 35/00* | (2010.01) |
| *B29D 35/04* | (2010.01) |
| *B29D 35/14* | (2010.01) |
| *A43D 9/00* | (2006.01) |
| *A43B 9/18* | (2006.01) |
| *A43B 23/02* | (2006.01) |
| *A43D 3/02* | (2006.01) |

(52) U.S. Cl.
CPC ......... *B29D 35/0027* (2013.01); *A43D 9/00* (2013.01); *B29D 35/04* (2013.01); *A43B 9/18* (2013.01); *A43B 23/0255* (2013.01); *A43D 3/02* (2013.01)

(58) Field of Classification Search
CPC .. B29D 35/0027; B29D 35/04; B29D 35/148; A43D 3/02; A43D 9/05
See application file for complete search history.

(56) References Cited

U.S. PATENT DOCUMENTS

| | | | |
|---|---|---|---|
| 5,785,909 A | 7/1998 | Chang et al. | |
| 5,979,079 A | 11/1999 | Krajcir | |
| 6,439,536 B1 | 8/2002 | Piccolo | |
| 7,047,668 B2 | 5/2006 | Burris et al. | |
| 7,056,459 B2 | 6/2006 | Park | |
| 7,793,434 B2 | 9/2010 | Sokolowski et al. | |
| 8,065,818 B2 | 11/2011 | Greene et al. | |
| 8,215,032 B2 | 7/2012 | Sokolowski et al. | |
| 8,505,216 B2 | 8/2013 | Sokolowski et al. | |
| 8,549,688 B2 * | 10/2013 | Leitner | A43B 5/0482 12/114.2 |
| 8,662,875 B2 | 3/2014 | Lim et al. | |
| 8,789,295 B2 | 7/2014 | Burch et al. | |
| 8,800,085 B2 | 8/2014 | Sussmann | |
| 9,573,331 B2 | 2/2017 | McDowell | |
| 2010/0047550 A1 | 2/2010 | Prissok et al. | |
| 2010/0222442 A1 | 9/2010 | Prissok et al. | |
| 2011/0030245 A1 | 2/2011 | Truelsen | |
| 2013/0192086 A1 | 8/2013 | Tawney et al. | |

(Continued)

FOREIGN PATENT DOCUMENTS

| | | | | |
|---|---|---|---|---|
| CN | 103183955 A | | 7/2013 | |
| EP | 0795280 A2 | * | 9/1997 | ......... B29D 35/0036 |
| KR | 10-2016-0091103 A | | 8/2016 | |

*Primary Examiner* — Robert B Davis
(74) *Attorney, Agent, or Firm* — Sterne, Kessler, Goldstein & Fox P.L.L.C.

(57) ABSTRACT

A method of manufacturing an article of footwear includes positioning an upper on a last that defines openings connected by one or more channels in the last, injecting a material through the one or more channels in the last, and forming a structure on the upper with the material.

20 Claims, 16 Drawing Sheets

(56) References Cited

U.S. PATENT DOCUMENTS

| | | | |
|---|---|---|---|
| 2014/0068879 A1* | 3/2014 | Sussmann | B29D 35/064 |
| | | | 12/146 B |
| 2015/0374070 A1 | 12/2015 | Tawney et al. | |
| 2017/0280828 A1 | 10/2017 | Berger et al. | |

* cited by examiner

FOOTWEAR WITH PADDING AND MIDSOLE STRUCTURES AND THE METHOD OF MAKING THE SAME

BACKGROUND

Field

Embodiments of the present invention relate generally to footwear components, and more specifically to footwear components made from a polymeric material injected through various ports of a 3D object, such as a last.

Background

Injection molding is used in footwear manufacturing to make various footwear components, such as midsoles, outsoles, and cleat plates. In known uses of injection molding, material is injected through in-gates of a set of mold plates and shaped based on the style of the mold plates. These systems lack the flexibility to mold and shape footwear components creatively and therefore limit manufacturing (e.g., limited to the mold plates' shapes, limited to the material best suited for the process, etc.). In addition, the process is cumbersome and time-consuming. Therefore, there is a need to improve shaping footwear components in an efficient, customizable, and fast manner.

BRIEF SUMMARY

Footwear with padding and midsole structures are disclosed, as well as the method of making such footwear components. In some embodiments, the footwear components are made from at least one polymeric material injected through various ports of a 3D object, such as a last. The footwear components include, but are not limited to, a midsole, heel counters, ankle and heel padding, medial and lateral supports, and other internal or external structures. In some embodiments, the footwear components are made by injecting at least one polymeric material through a last having channels within the structure. In some embodiments, the channels include openings from which material exits and forms the desired footwear components. In some embodiments, the footwear components are formed in and around a 3D footwear upper component, such as a knitted sock or similar material.

In some embodiments, a method of manufacturing an article of footwear includes positioning an upper on a last. In some embodiments, the last defines openings connected by one or more channels in the last. In some embodiments, a method of manufacturing an article of footwear includes injecting a material through the one or more channels in the last and forming a structure on the upper with the material.

In some embodiments, the structure includes a midsole. In some embodiments, the structure includes upper padding. In some embodiments, the openings include an inlet at a top of the last and an outlet at a bottom of the last.

In some embodiments, the method includes customizing the structure based on data associated with a wearer. In some embodiments, customizing the structure includes customizing a location of the structure. In some embodiments, customizing the structure includes customizing a shape of the structure. In some embodiments, customizing the structure includes customizing the material of the structure. In some embodiments, the method includes customizing the upper based on data associated with a wearer.

In some embodiments, the last defines a cavity at a bottom portion of the last. In some embodiments, the cavity extends most of the length of the last and most of the width of the last. In some embodiments, forming the structure on the upper includes forming an insole in the cavity.

In some embodiments, the last includes a pattern with at least one of engraved features and embossed features.

In some embodiments, a method of manufacturing an article of footwear includes positioning an upper on a last, injecting a material through the last, and forming upper padding and a midsole with the material in a single, continuous process. In some embodiments, the method includes injecting a second material through the last. In some embodiments, the method includes using a modular attachment to shape the upper padding. In some embodiments, the method includes obtaining foot data associated with a wearer. In some embodiments, the method includes using the foot data associated with the wearer to customize the midsole and the upper padding.

In some embodiments, an article of footwear includes an upper and a single-injection midsole and padding disposed on the upper. In some embodiments, the single-injection midsole and padding is distinct from the upper. In some embodiments, the padding is disposed on an outside of the upper. In some embodiments, the padding is disposed on an inside of the upper. In some embodiments, the padding is customized based on foot data associated with a wearer. In some embodiments, the midsole includes multiple materials. In some embodiments, the midsole includes a multi-density material.

In some embodiments, a last includes a body defining a channel extending from an inlet opening to an outlet opening. In some embodiments, the body of the last defines multiple channels. In some embodiments, the last includes one or more patterns on an outer surface of the body. In some embodiments, the patterns are embossed on the outer surface. In some embodiments, the patterns are engraved on the outer surface. In some embodiments, the patterns include embossed and engraved features. In some embodiments, the patterns include ridges or raised structures. In some embodiments, the patterns are disposed in one or more of the heel region, midfoot region, and forefoot region. In some embodiments, the patterns are disposed in one or more of the toe-box, vamp, quarters, or tongue region of the last.

BRIEF DESCRIPTION OF THE DRAWINGS

The accompanying drawings, which are incorporated herein and form a part of the specification, illustrate the present invention and, together with the description, further explain the principles of the invention and enable a person skilled in the pertinent art to make and use the invention.

DETAILED DESCRIPTION

Figure 1:
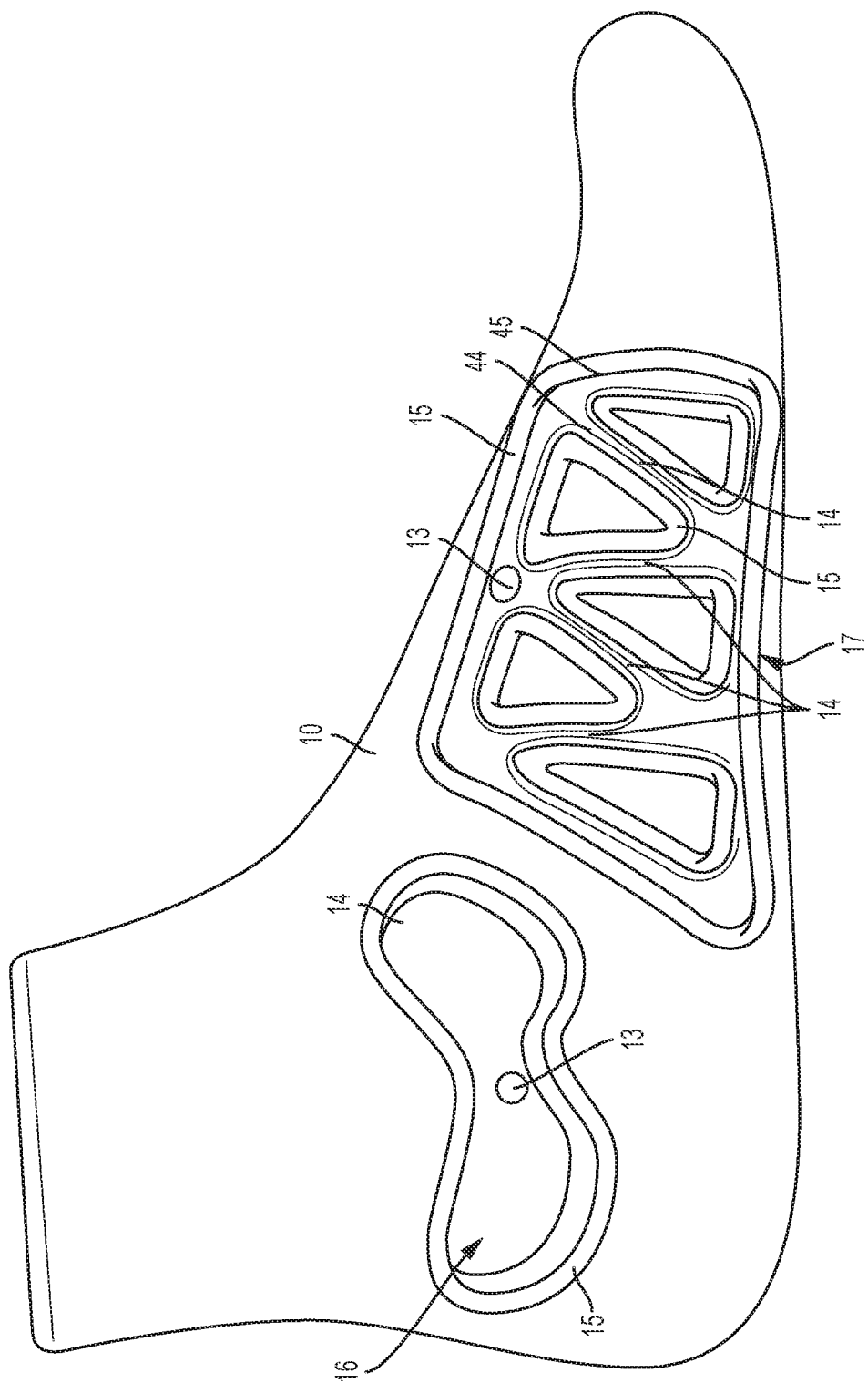
FIG. 1 shows a side view of a last according to some embodiments.

The present invention will now be described in detail with reference to embodiments thereof as illustrated in the accompanying drawings, in which like reference numerals are used to indicate identical or functionally similar elements. References to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The term "invention" or "present invention" as used herein is a non-limiting term and is not intended to refer to any single embodiment of the particular invention but encompasses all possible embodiments as described in the application.

The following examples are illustrative, but not limiting, of the present invention. Other suitable modifications and adaptations of the variety of conditions and parameters normally encountered in the field, and which would be apparent to those skilled in the art, are within the spirit and scope of the invention.

Embodiments of the present invention provide footwear with padding and midsole structures, a method for making the padding and midsole structures, and a last for making the padding and midsole structures. In some embodiments, the provided footwear may be athletic shoes. For example, the provided footwear may be a running shoe, a soccer shoe, a basketball shoe, a football shoe, a tennis shoe, or any other athletic shoe. In some embodiments, the provided footwear may be a non-athletic shoe.

In some embodiments, a last is provided that defines openings connected by one or more channels. A polymeric material may be injected through the openings and channels to form a structure at various locations on an upper. For example, footwear components may be formed in and around a 3D upper component, such as a knitted sock. In some embodiments, intricate shapes can be formed inside and/or outside the upper with the use of the last. In some embodiments, tools external to the last (i.e., attachments) may help form the footwear components and channel the polymeric material.

In some embodiments, a last 10, as shown, for example, in FIG. 1, is used to create padding and midsole structures. The structures may be used for comfort, fit, support, haptic feedback, stiffness, flexibility, or other purposes as part of the upper or the sole of an article of footwear. In some embodiments, last 10 includes one or more ports or openings 12, 13 (see FIG. 3). In some embodiments, opening 12 comprises an inlet port. In some embodiments, opening 13 comprises an outlet port. In some embodiments, openings 12, 13 are connected by one or more channels 11 (see FIG. 4) in last 10. In some embodiments, channels 11 are disposed in an interior portion of last 10. In some embodiments, channels 11 and openings 12, 13 form a network of passageways through which a material may flow, such as a polymeric material. In some embodiments, one or more channels 11 may intersect such that material may flow from one passageway into another passageway.

In some embodiments, a polymeric material is transferred into inlet opening 12 through a soft nozzle cover. The soft nozzle cover may be made of silicone or a similar elastomeric material. In some embodiments, the soft nozzle cover expands within inlet opening 12 to create a hermetic seal between the nozzle and inlet opening 12. In some embodiments, other devices or methods may be used to create a seal between the nozzle and inlet opening 12. For example, an O-ring may be used to facilitate a seal between the nozzle and inlet opening 12.

In some embodiments, inlet opening 12 is disposed on a flat surface of last 10. In some embodiments, inlet opening 12 is disposed on an upper portion of last 10 above the foot form, as shown, for example, in FIG. 3. Other placements of inlet opening 12 are also possible. Outlet openings 13 may be disposed in a variety of locations (e.g., anywhere a footwear component is desired to be created). In some embodiments, one or more outlet openings 13 are disposed on a lateral side of last 10. In some embodiments, one or more outlet openings 13 are disposed on a medial side of last 10. In some embodiments, one or more outlet openings 13 are disposed on a bottom side of last 10. In some embodiments, one or more outlet openings 13 are disposed on a top side of last 10 (e.g., over a forefoot). In some embodiments, one or more outlet openings 13 are disposed in a heel area of last 10. In some embodiments, one or more outlet openings 13 are disposed in a toe area of last 10. A combination of these positions may also be used. Other placements of outlet openings 13 are also possible (e.g., at the vamp, quarters, tongue, etc.).

In some embodiments, inlet opening 12 is disposed at a top of last 10 and outlet opening 13 is disposed at a bottom of last 10. In some embodiments, inlet opening 12 is disposed at a bottom of last 10 and outlet opening 13 is disposed at a top of last 10. In some embodiments, inlet opening 12 or outlet opening 13 is disposed between a top and a bottom of last 10.

In some embodiments, the polymeric material comprises a polyurethane foam. In some embodiments, the polyurethane foam (or other polymeric materials) may be a single density. In some embodiments, the polyurethane foam (or other polymeric materials) may be a multi-density material. In some embodiments, the polymeric material comprises silicone, urethane, thermoplastic polyurethane, thermoplastic polymer, elastomers, or other liquid plastics. Other materials may also be injected through channels 11 and openings 12, 13, such as air or other gases. For example, specific additives may be injected with the polymeric material to speed up or slow down the curing process of the polymeric material.

In some embodiments, last 10 includes one or more patterns that are embossed on and/or engraved into regions of last 10. The patterns may be disposed in one or more of the heel region, midfoot region, and forefoot region. The patterns may be disposed on a top, bottom, or side of last 10.

In some embodiments, last 10 includes one or more engraved features 14 (e.g., a cavity or a recess) on an exterior surface of last 10. In some embodiments, last 10 includes one or more embossed features 15 on an exterior surface of last 10. In some embodiments, engraved features 14 and/or embossed features 15 form various patterns on last 10. In some embodiments, engraved features 14 and/or embossed features 15 are disposed at or near outlet openings 13. In some embodiments, outlet openings 13 are disposed within an engraved feature 14. In some embodiments, outlet openings 13 are surrounded by an embossed feature 15. In some embodiments, the ridges or raised structures 45 of embossed feature 15 (or edges 44 of engraved feature 14) define a closed area and may help control flashing of the polymeric material when it is injected through channels 11 and outlet openings 13. In some embodiments, the engraved feature 14 and/or the embossed feature 15 define a concave area, as shown, for example, in FIG. 1.

In some embodiments, engraved features 14 and/or embossed features 15 are configured to facilitate forming a footwear component. For example, last 10 in FIG. 1 includes an ankle padding pattern 16 with engraved features 14 and embossed features 15 and a midfoot support pattern 17 with engraved features 14 and embossed features 15. In some embodiments, ankle padding pattern 16 is configured to form an ankle padding 36 (see FIG. 5) with polymeric material that is injected through channels 11 and opening 13. In some embodiments, midfoot support pattern 17 is configured to form a midfoot support cage 67 (see FIG. 16) with polymeric material that is injected through channels 11 and opening 13.

In some embodiments, engraved features 14 are used to form internal padding and support. In some embodiments, embossed features 15 are used to form a component that provides haptic texture and/or a 3D design. In some embodiments, engraved features 14 and/or embossed features 15 are used to form an external component. Patterns on last 10 may be made with only engraved features 14, only embossed features 15, or a combination of engraved features 14 and embossed features 15. In some embodiments, edges of embossed features 15 create a seal around a portion of a 3D footwear upper component disposed on last 10, preventing the polymeric material from seeping outside of engraved features 14 and embossed features 15.

In some embodiments, last 10 may include other patterns instead of or in addition to ankle padding pattern 16 and midfoot support pattern 17. In addition, in some embodiments, different configurations of ankle padding pattern 16 and/or midfoot support pattern 17 may be used. In some embodiments, last 10 may include embossed and/or engraved patterns in the toe-box, vamp, quarters, tongue, or other regions of last 10. As discussed in more detail below, last 10 may be configured to provide a custom article of footwear with custom padding and other structures. Thus, a large variety of last configurations and features are possible.

Figure 2:
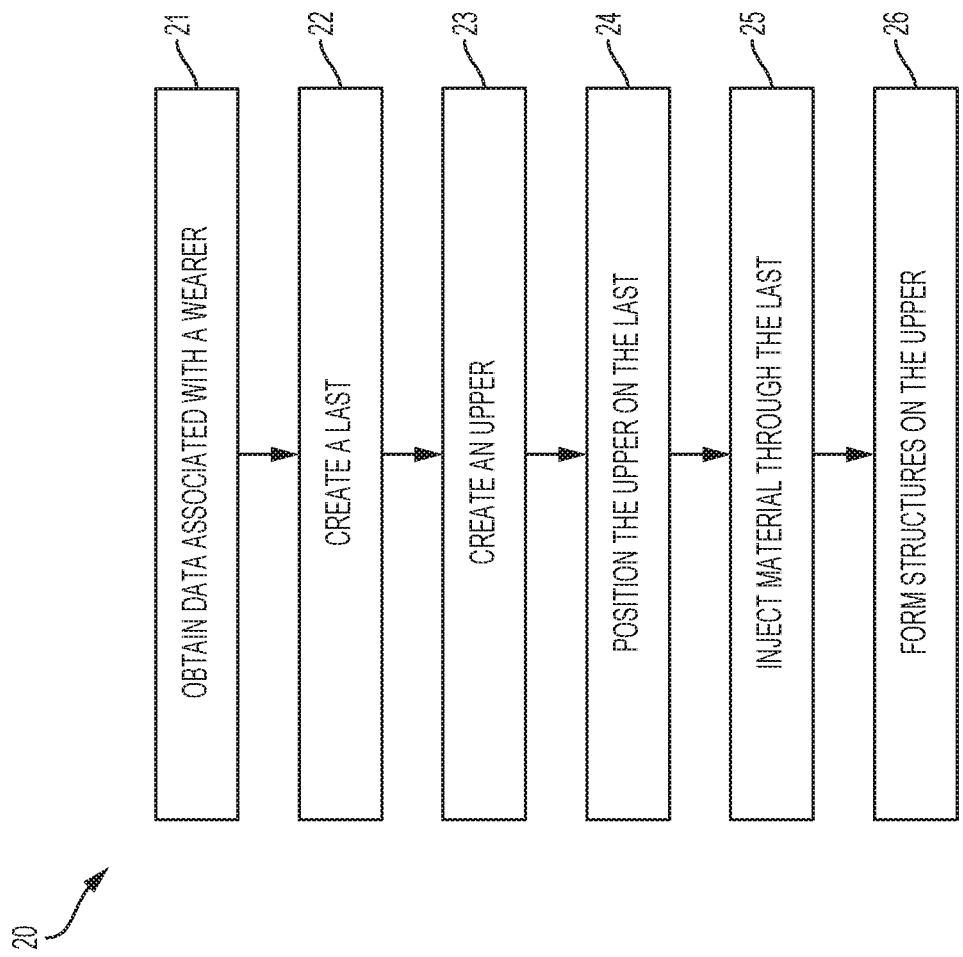
FIG. 2 shows a method of manufacturing an article of footwear according to some embodiments.

In some embodiments, last 10 is used to make an article of footwear and footwear components. For example, a method 20 for making an article of footwear is shown in FIG. 2. The operations of method 20 discussed below are exemplary. In some embodiments, additional operations may be part of the method. In some embodiments, not all of the operations shown in FIG. 2 are completed. In some embodiments, the order of operations may vary from the order shown in FIG. 2.

In some embodiments, at operation 21, data associated with a wearer is obtained. In some embodiments, the data includes the wearer's foot data, performance data, and other data related to creating a customized article of footwear for the wearer. In some embodiments, data may be obtained by performing a foot scan to assess a foot profile for the wearer (e.g., using cameras and/or sensors). In some embodiments, a wearer's foot strike profile is measured and analyzed to create an ideal profile for the wearer (e.g., using accelerometers or other sensors). Data may be obtained with other methods. In some embodiments, the data may be obtained in a retail environment. In some embodiments, data may be obtained in the manner described in U.S. application Ser. No. 15/478,902, filed Apr. 4, 2017 and published as U.S. Publication No. 2017/0280828 A1, the disclosure of which is incorporated herein in its entirety by reference thereto. The data obtained using one or more of these methods may be used to customize an article of footwear for a particular wearer.

In some embodiments, at operation 22, a last (such as last 10) is created. In some embodiments, the last's configuration is based on the data obtained at operation 21. Thus the last may be customized to a particular wearer. In some embodiments, the last is created based on a predefined digital last, as described in U.S. application Ser. No. 15/478,902, filed Apr. 4, 2017 and published as U.S. Publication No. 2017/0280828 A1, the disclosure of which is incorporated herein in its entirety by reference thereto. The predefined digital last may be modified based on the wearer's foot data.

In some embodiments, the last is created with openings and channels (such as those discussed above for last 10) to form a network of passageways through which a polymeric material may be injected. In some embodiments, the last is created with patterns on the last (such as those discussed above for last 10). In some embodiments, the modified last may be used to determine placement of patterns on the last (such as padding patterns or support patterns), as well as sole design, for a particular wearer. The modified last may also be used to determine other parameters for the patterns on the last, including, for example, the number of patterns on the last, the size of patterns on the last, and the shape of patterns on the last.

In some embodiments, at operation 23, an upper (such as upper 31 (see FIG. 5)) is created. In some embodiments, the upper is primarily a knit material. In some embodiments, the upper is made of a 3D knit material. In some embodiments, the upper may be made of woven, non-woven, braid, and other forms of textile materials. In some embodiments, the upper may be made of leather. In some embodiments, the upper's configuration is based on the data obtained at operation 21. For example, the type of material, physical properties of the material, and other parameters may be based on the data obtained at operation 21.

In some embodiments, at operation 24, the upper is positioned on the last. In some embodiments, the upper is positioned on the last with its interior side facing the last. In some embodiments, the upper is positioned on the last with its exterior side facing the last (i.e., inside out).

In some embodiments, at operation 25, material is injected through the last. In some embodiments, the material is a polymeric material. In some embodiments, more than one material is injected through the last, either simultaneously or sequentially. In some embodiments, the material is injected through an inlet opening (e.g., opening 12). In some embodiments, the inlet opening 12 is disposed at a top surface of last 10 (see FIG. 3). In some embodiments, the material travels through inlet opening 12 into one or more channels 11. Channels 11 may form a network of passageways and transfer the material to one or more outlet openings 13 in various regions of last 10.

In some embodiments, at operation 26, structures (e.g., padding, support, midsole, etc.) are formed on the upper (e.g., upper 31) from the polymeric material. In some embodiments, the structures may be formed on an interior side of the upper. In some embodiments, the structures may be formed on an exterior side of the upper. In some embodiments, the structures, such as an upper padding and a midsole, are formed in a single, continuous process. In some embodiments, the structures are formed simultaneously. For example, a midsole and an ankle padding may be formed simultaneously with a single injection of polymeric material. In some embodiments, the structures may be formed sequentially (e.g., ankle padding is formed after the midsole). In some embodiments, the structures are customized based on the data obtained at operation 21. For example, the location, shape, size, and/or material of the structure may be customized.

After the structures are formed, the upper, which now includes additional structures or footwear components, may be removed from the last. As noted above, additional operations may be performed. For example, in some embodiments, the last may be cleaned after the injection is complete and the upper is removed.

Examples of various lasts, footwear components, and articles of footwear are shown in FIGS. 3-13. In some embodiments, the features shown in the lasts, footwear components, and articles of footwear of FIGS. 3-13 may be combined or modified to create other variations of lasts, footwear components, and articles of footwear. For example, ankle padding pattern 16 in FIG. 3 and midfoot support pattern 17 in FIG. 6 may be included on a single last. Other combinations and variations are also possible. These variations may depend on the customization for a particular wearer, as noted above.

Figure 3:
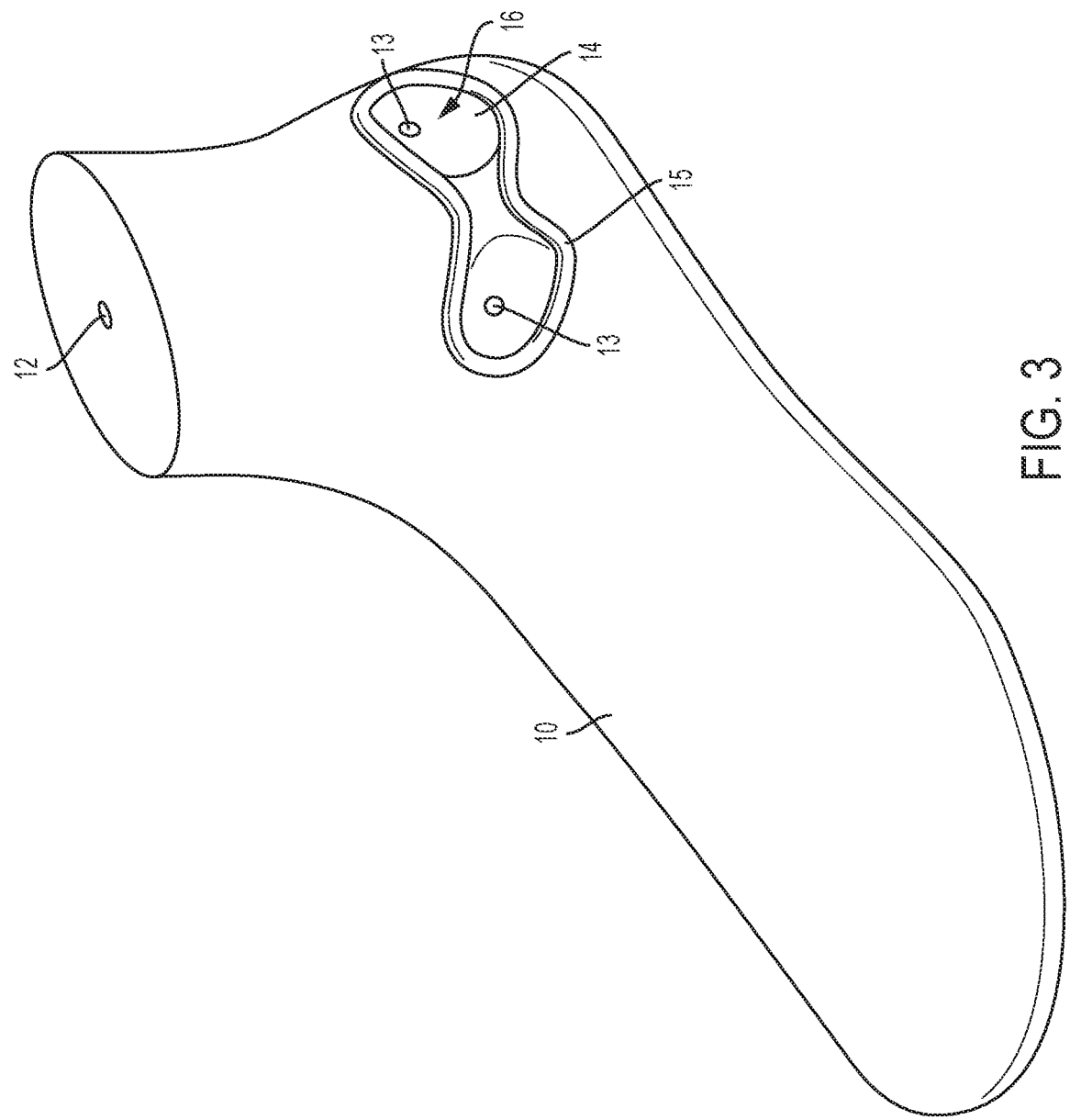
FIG. 3 shows a perspective view of a last with an ankle padding pattern according to some embodiments.
Figure 4:
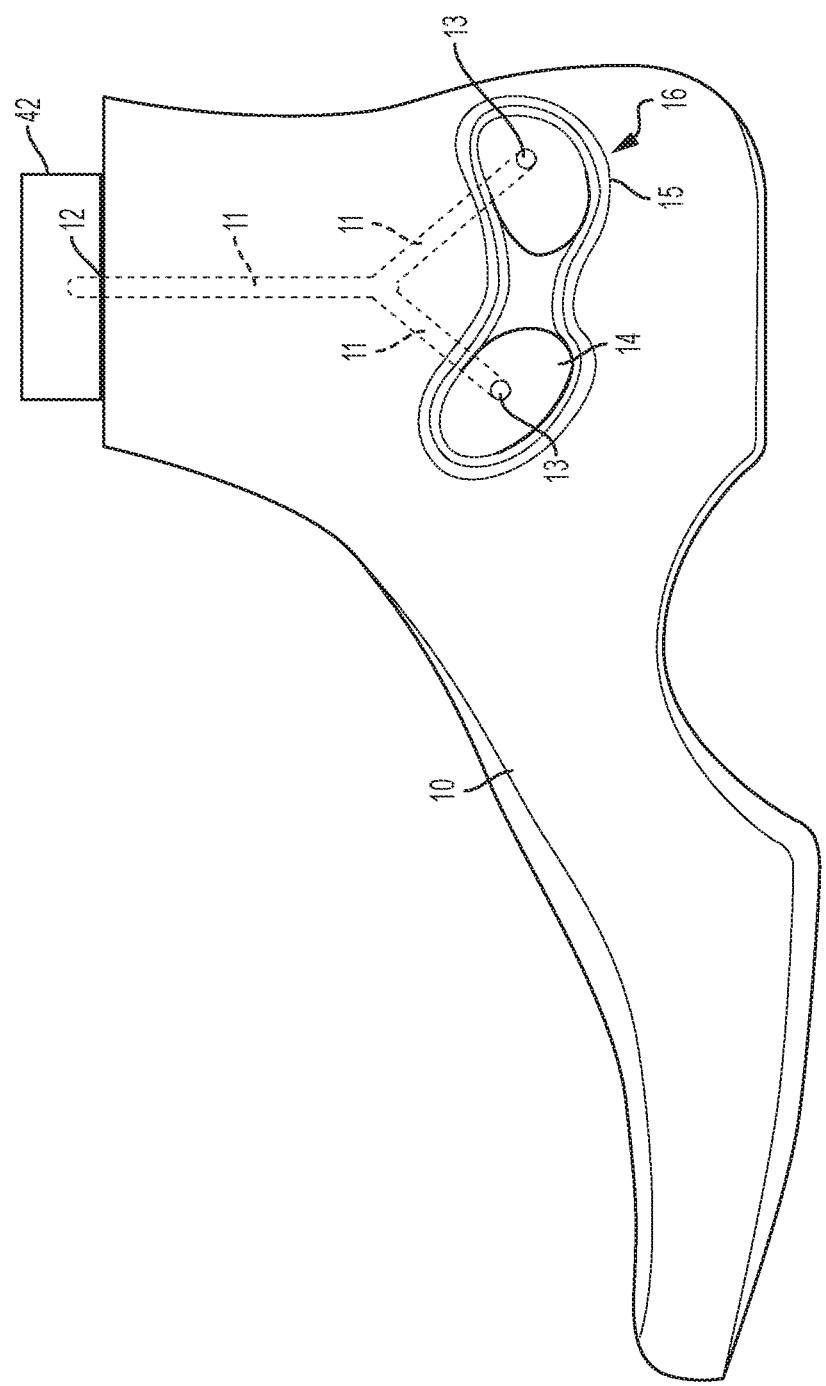
FIG. 4 shows a side view of a last with an ankle padding pattern and internal channels according to some embodiments.

In some embodiments, a last 10, as shown, for example, in FIGS. 3 and 4, includes an inlet opening 12 and outlet openings 13. Channels 11 connect inlet opening 12 with outlet openings 13. As shown in FIG. 4, channels 11 are internal channels (indicated in dotted lines) disposed within last 10. In some embodiments, inlet opening 12, outlet openings 13, and channels 11 form a network of passageways through the last for directing polymeric material to various locations on the last. In some embodiments, inlet opening 12 is disposed on a top of last 10, for example, the portion of last 10 associated with an opening in an upper to receive a wearer's foot, as shown in FIG. 3. In some embodiments, last 10 includes a structure 42 surrounding inlet opening 12, as shown, for example, in FIG. 4. Structure 42 may be configured to hold polymeric material just before it enters inlet opening 12.

In some embodiments, last 10 includes ankle padding pattern 16. While FIG. 3 shows a lateral ankle padding pattern 16 on last 10, last 10 may additionally or alternatively include a medial ankle padding pattern 16. In some embodiments, medial ankle padding pattern 16 may be disposed higher on last 10 than lateral ankle padding pattern 16. In some embodiments, ankle padding pattern 16 includes two outlet openings 13. In some embodiments, last 10 includes a channel 11 extending down from inlet opening 12. In some embodiments, channel 11 breaks into two channels 11, one for each outlet opening 13. In some embodiments, where last 10 includes a medial and a lateral ankle padding pattern 16, channel 11 may break into four channels 11.

Different numbers and configurations of channels 11 are included based on the number and location of outlet openings 13. In some embodiments, ankle padding pattern 16 includes both engraved features 14 and embossed features 15. In some embodiments, ankle padding pattern 16 is configured to create ankle padding 36 (see FIG. 5) when polymeric material is moved through channels 11 to outlet opening 13.

Figure 5:
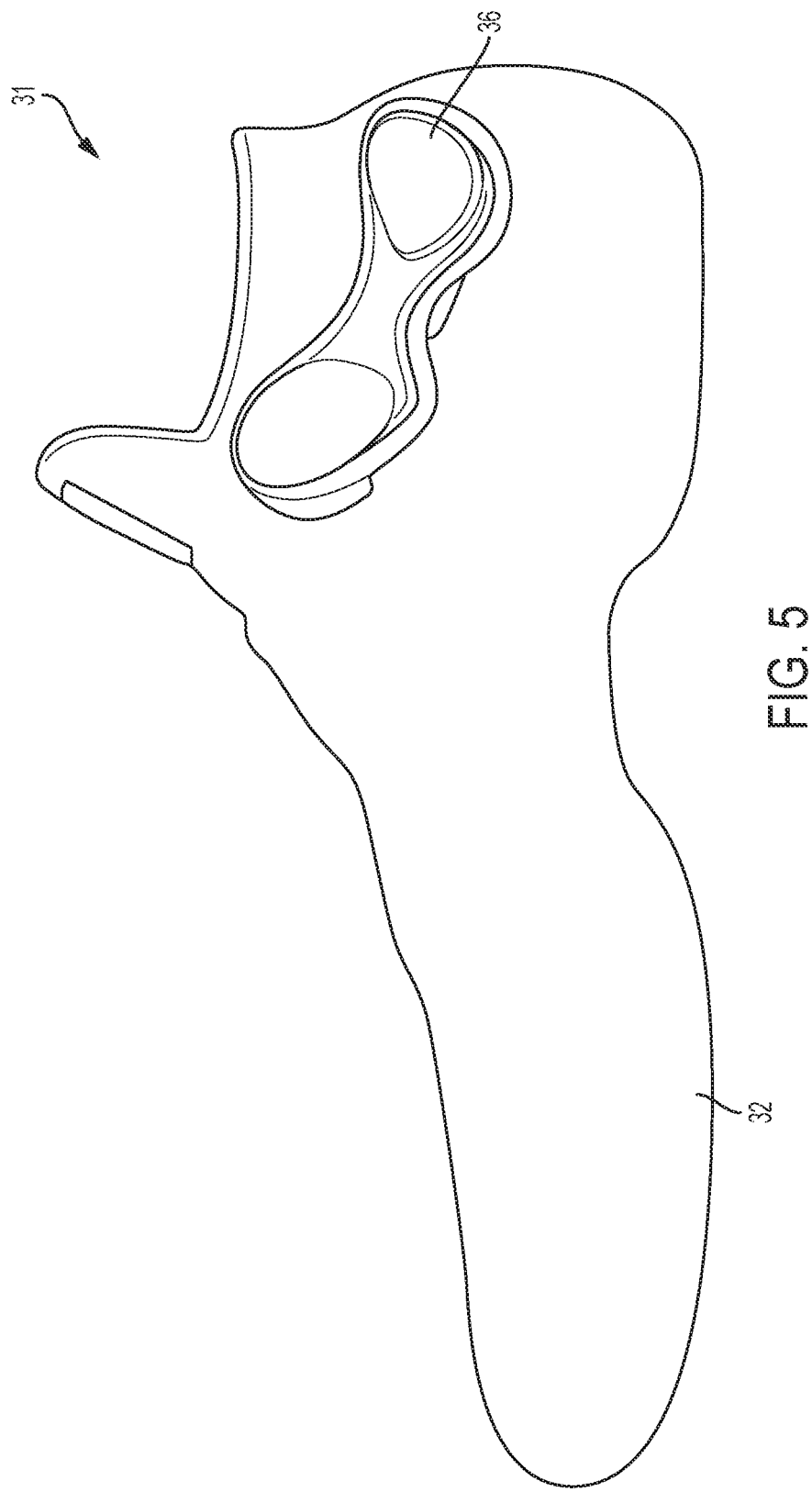
FIG. 5 shows a side view of an upper according to some embodiments.

In some embodiments, last 10 may be used to make upper 31, as shown in FIG. 5. A base layer 32 is placed around last 10. In some embodiments, base layer 32 comprises a textile material, such as a knit or a woven material. In some embodiments, base layer 32 comprises a three-dimensional knit textile material. In some embodiments, polymeric material is moved through channels 11 to outlet opening 13 when base layer 32 is disposed on last 10. In some embodiments, the polymeric material adheres to base layer 32 as it solidifies or cures to form ankle padding 36.

In some embodiments, the polymeric material seeps through base layer 32 to form ankle padding 36 on an exterior surface of base layer 32. In some embodiments, the polymeric material forms ankle padding 36 on an interior surface of base layer 32. In some embodiments, base layer 32 may be placed on last 10 inside out so that ankle padding 36 is formed on an exterior surface of base layer 32 without passing through base layer 32. After ankle padding 36 has been formed, upper 31 (including base layer 32 and ankle padding 36) may be removed from last 10.

Figure 6:
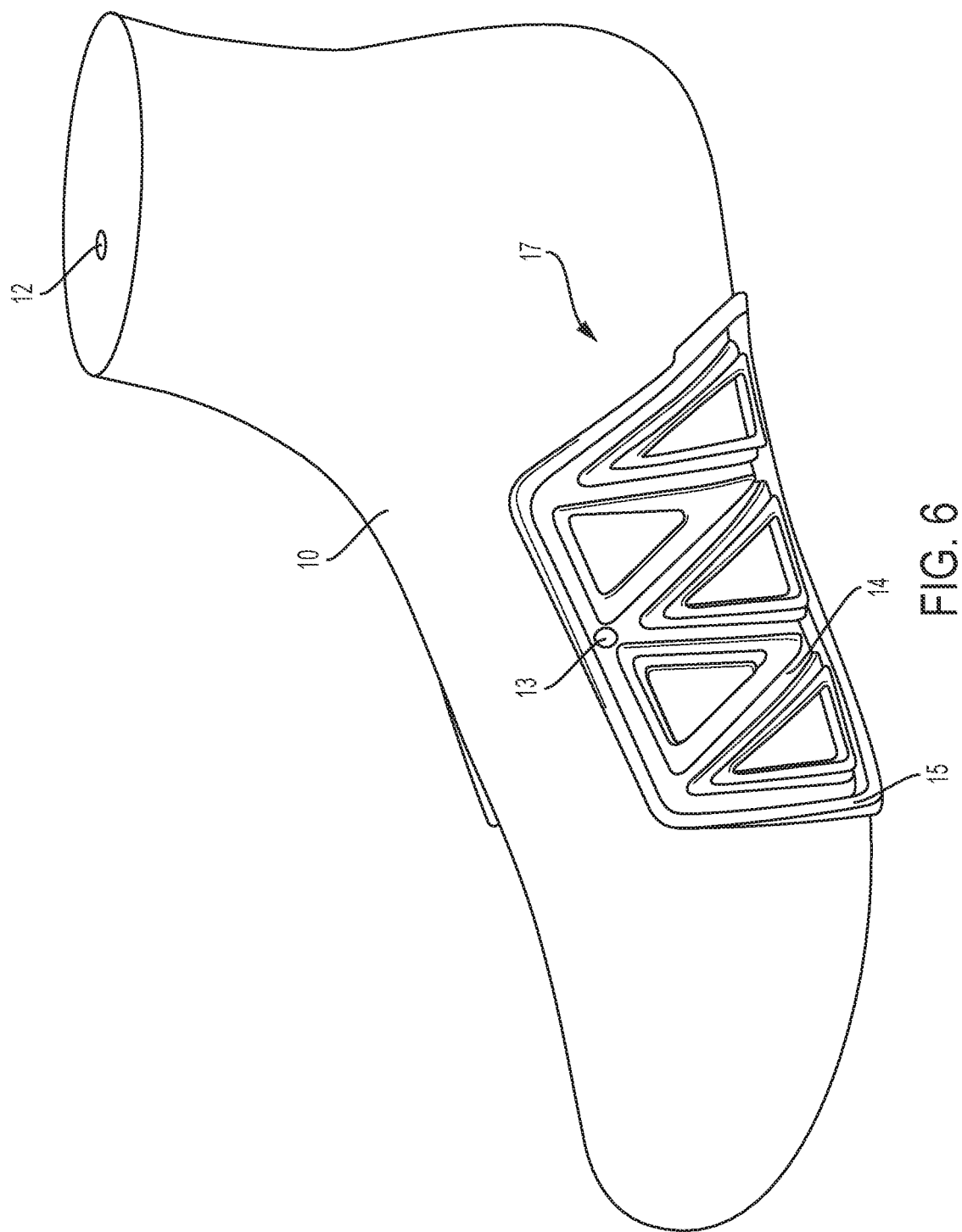
FIG. 6 shows a perspective view of a last with a midfoot support pattern according to some embodiments.
Figure 7:
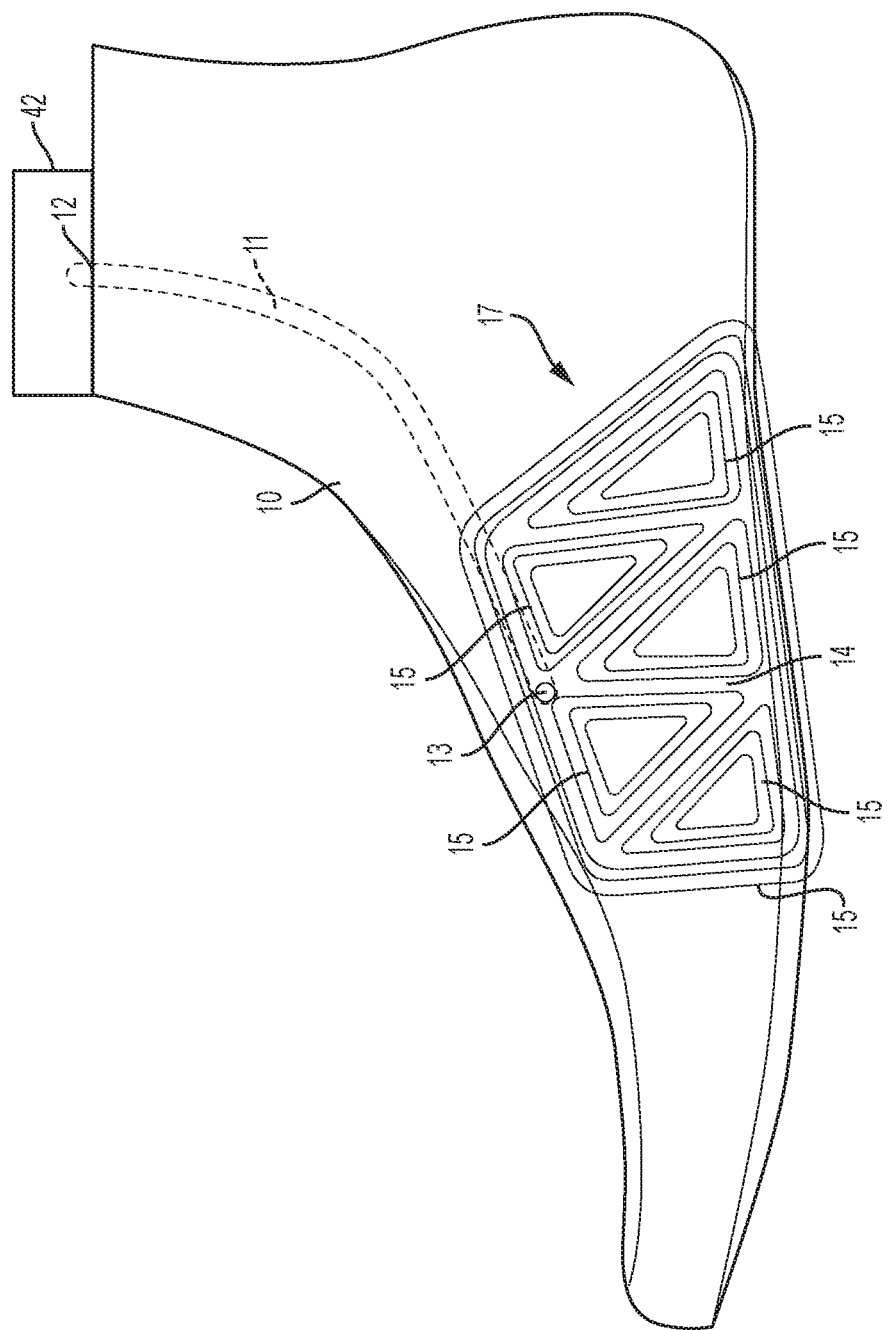
FIG. 7 shows a side view of a last with a midfoot support pattern and an internal channel according to some embodiments.

In some embodiments, a last 10, as shown, for example, in FIGS. 6 and 7, includes an inlet opening 12, an outlet opening 13, and a channel 11 connecting inlet opening 12 to outlet opening 13. As shown in FIG. 7, channel 11 is an internal channel (indicated in dotted lines) disposed within last 10. In some embodiments, inlet opening 12 is disposed on a top of last 10, for example, the portion of last 10 associated with an opening in an upper to receive a wearer's foot, as shown in FIG. 6. In some embodiments, last 10 includes a structure 42 surrounding inlet opening 12, as shown, for example, in FIG. 7. Structure 42 may be configured to hold polymeric material just before it enters inlet opening 12.

In some embodiments, last 10 includes midfoot support pattern 17. While FIG. 6 shows a lateral midfoot support pattern 17 on last 10, last 10 may additionally or alternatively include a medial midfoot support pattern 17. In some embodiments, midfoot support pattern 17 includes one outlet opening 13. In some embodiments, midfoot support pattern 17 includes more than one outlet opening 13. In some embodiments, last 10 includes channel 11 extending from inlet opening 12 directly to outlet opening 13. In some embodiments, where last 10 includes a medial and a lateral midfoot support pattern 17, channel 11 may break into two channels 11, one leading to medial midfoot support pattern 17 and the other leading to the lateral midfoot support pattern 17. In some embodiments, midfoot support pattern 17 includes both engraved features 14 and embossed features 15. In some embodiments, midfoot support pattern 17 is configured to create midfoot support cage 67 (see FIG. 16) when polymeric material is moved through channel 11 to outlet opening 13.

In some embodiments, last 10 may be used to make an upper that includes midfoot support cage 67 in the same manner described above with respect to upper 31 that includes ankle padding 36. Last 10 may also be used to make an upper with both midfoot support cage 67 and ankle padding 36 (or with other footwear components).

Figure 8:
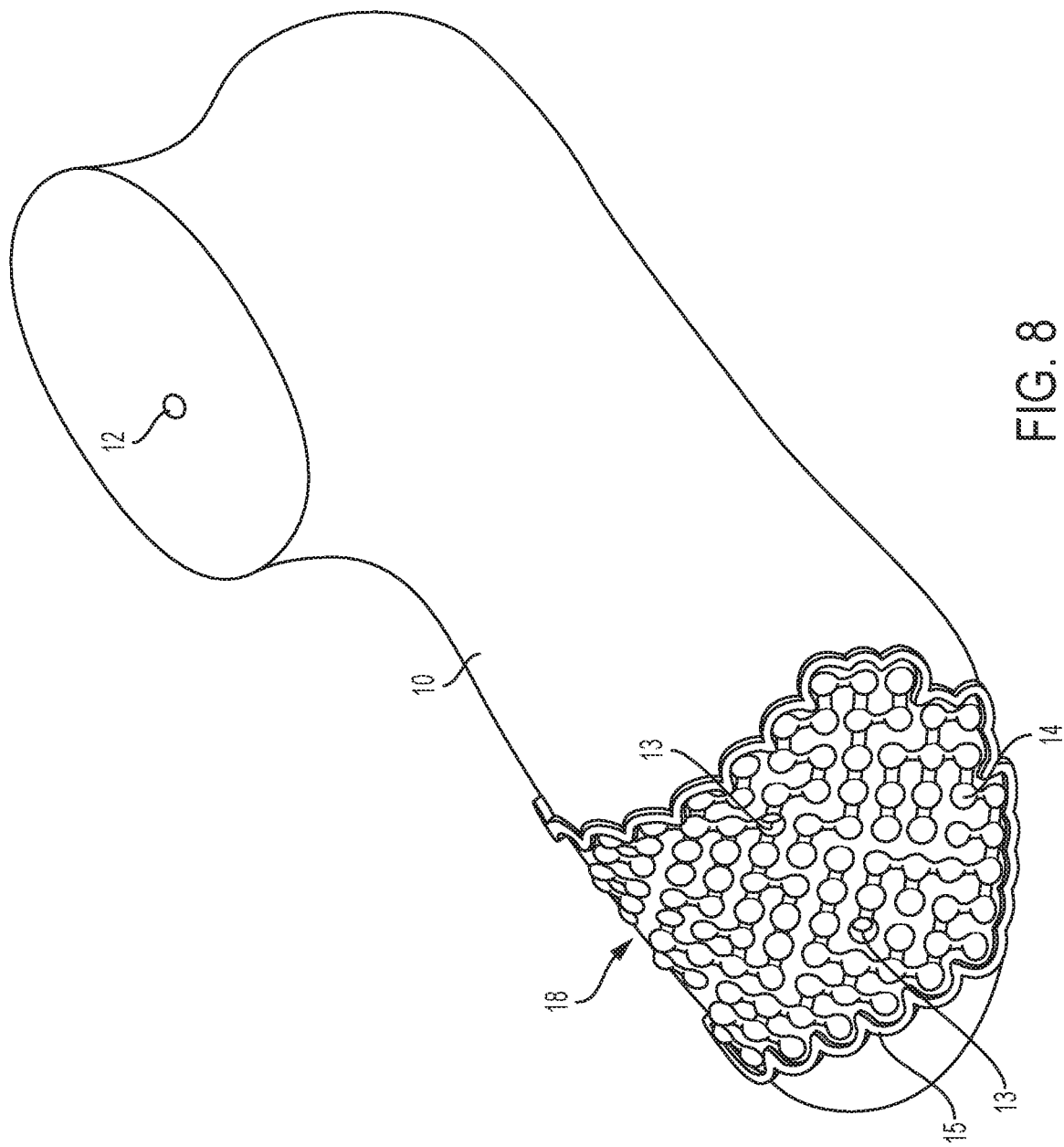
FIG. 8 shows a perspective view of a last with a forefoot pattern according to some embodiments.
Figure 9:
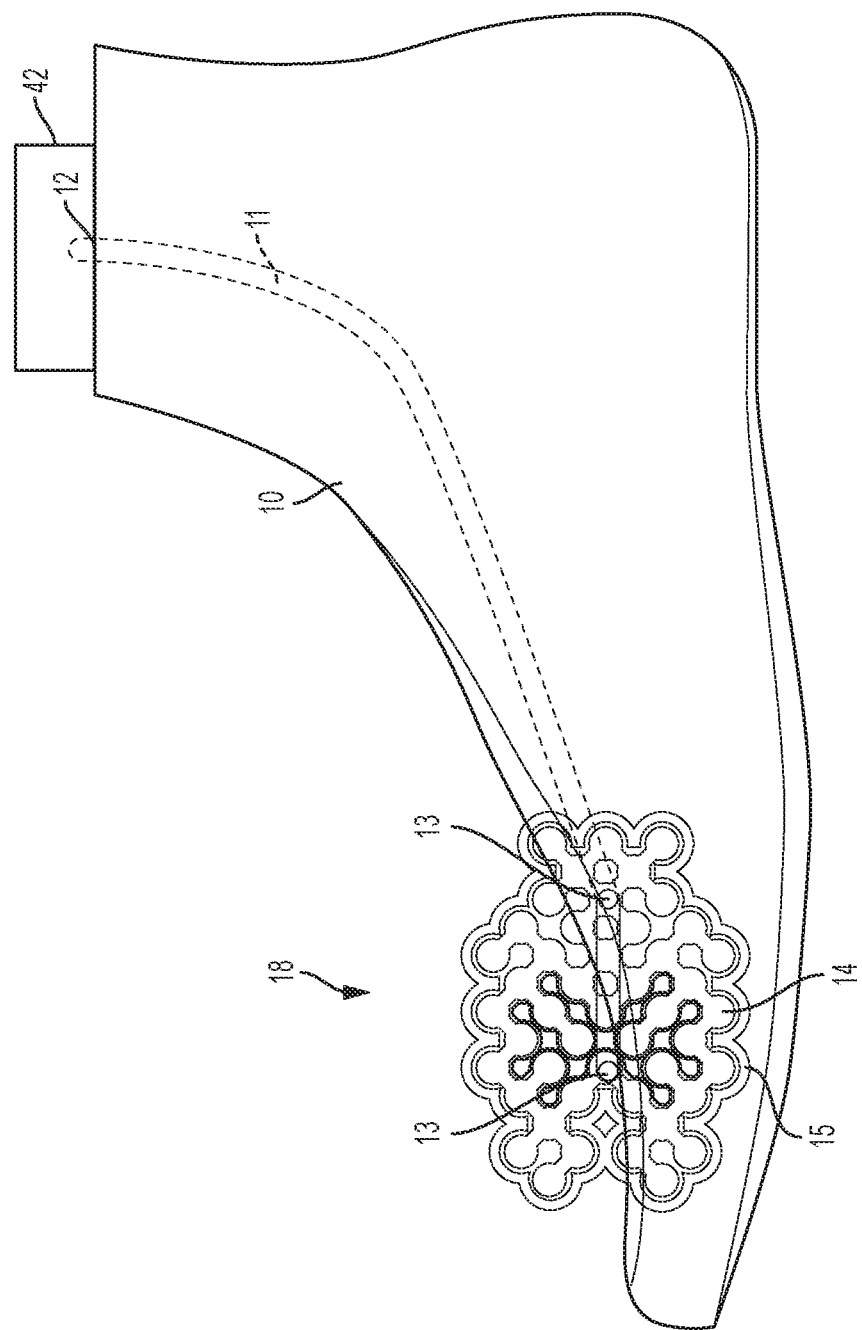
FIG. 9 shows a side view of a last with a forefoot pattern and an internal channel according to some embodiments.

In some embodiments, a last 10, as shown, for example, in FIGS. 8 and 9, includes an inlet opening 12, outlet openings 13, and a channel 11 connecting inlet opening 12 to outlet openings 13. As shown in FIG. 9, channel 11 is an internal channel (indicated in dotted lines) disposed within last 10. In some embodiments, inlet opening 12 is disposed on a top of last 10, for example, the portion of last 10 associated with an opening in an upper to receive a wearer's foot, as shown in FIG. 8. In some embodiments, last 10 includes a structure 42 surrounding inlet opening 12, as shown, for example, in FIG. 9. Structure 42 may be configured to hold polymeric material just before it enters inlet opening 12.

In some embodiments, last 10 includes forefoot pattern 18. Forefoot pattern 18 is shown in FIG. 9 as a plan view only for clarity. Forefoot pattern 18 is disposed across the top of last 10 in a forefoot region as shown in FIG. 8. In some embodiments, forefoot pattern 18 includes one outlet opening 13. In some embodiments, forefoot pattern 18 includes more than one outlet opening 13, as shown in FIG. 8. In some embodiments, last 10 includes channel 11 extending from inlet opening 12 directly to outlet openings 13. In some embodiments, forefoot pattern 18 includes both engraved features 14 and embossed features 15. In some embodiments, forefoot pattern 18 is configured to create a proprioceptive feature above the forefoot of the upper when polymeric material is moved through channel 11 to outlet opening 13.

In some embodiments, last 10 may be used to make an upper that includes a forefoot proprioceptive feature in the same manner described above with respect to upper 31 that includes ankle padding 36. Last 10 may also be used to make an upper with both a forefoot proprioceptive feature and additional components (such as midfoot support cage 67 and/or ankle padding 36).

Figure 10:
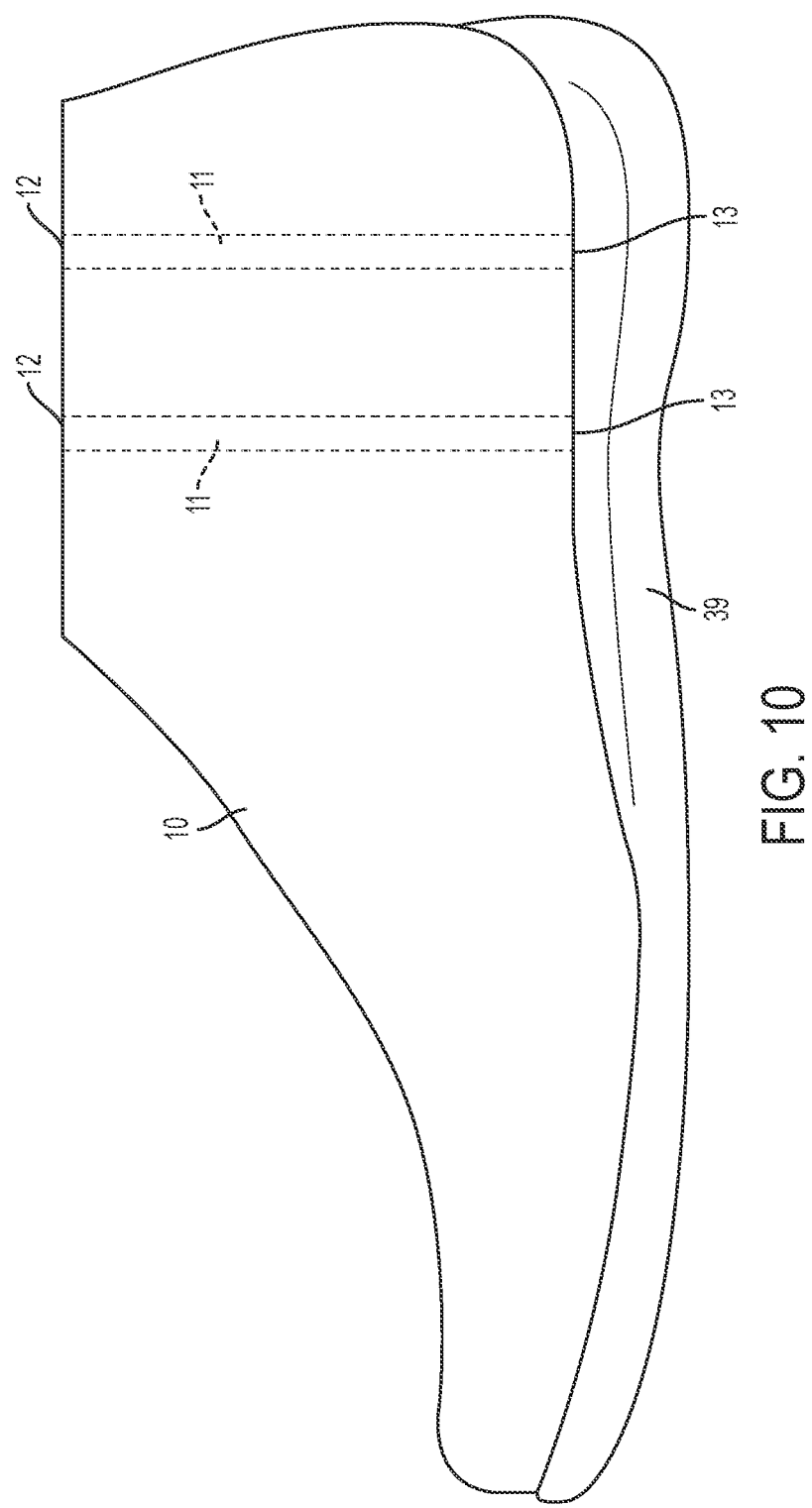
FIG. 10 shows a side view of a last with internal channels according to some embodiments.
Figure 11:
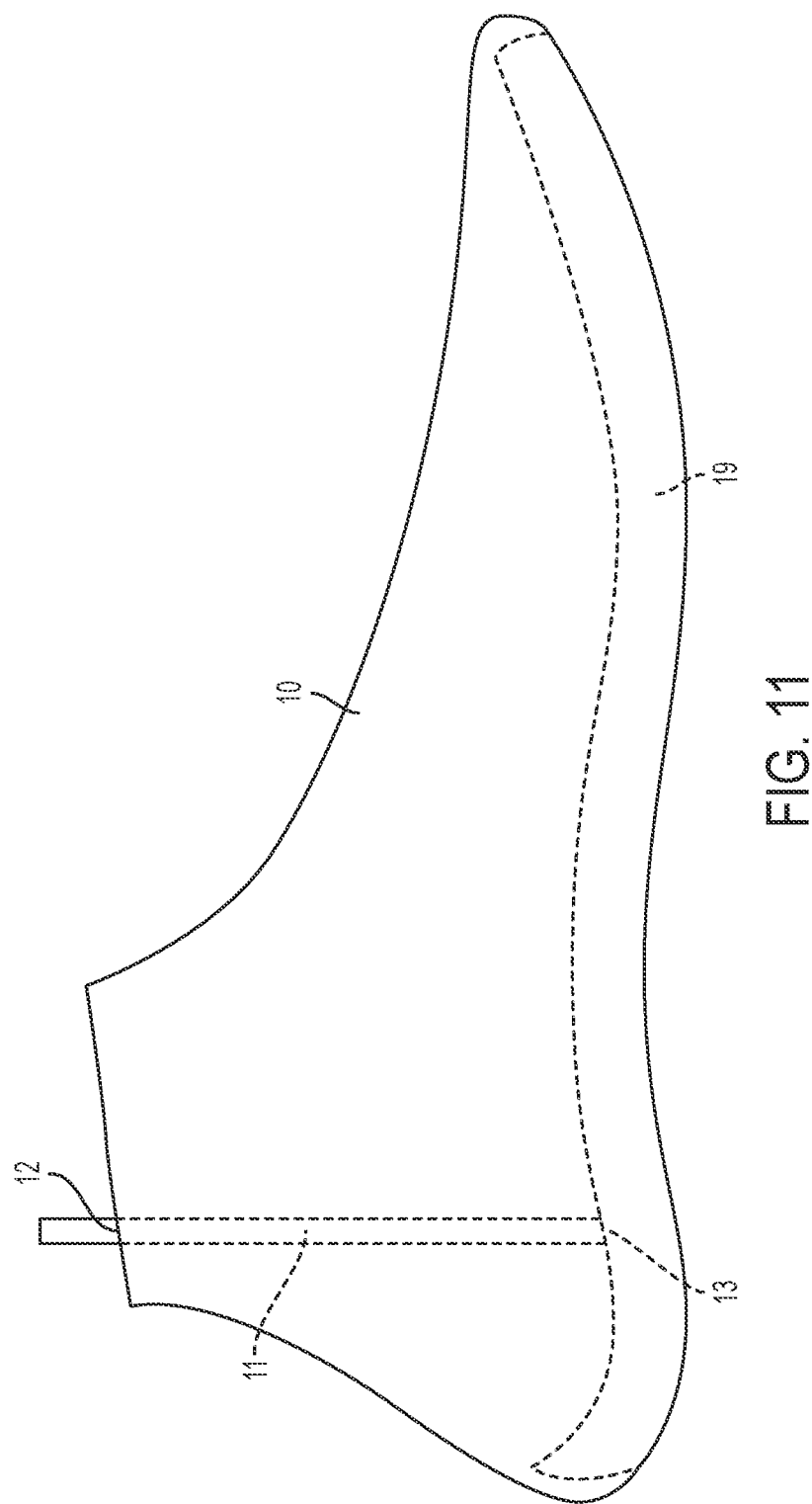
FIG. 11 shows a side view of a last with a sole pattern and an internal channel according to some embodiments.
Figure 12:
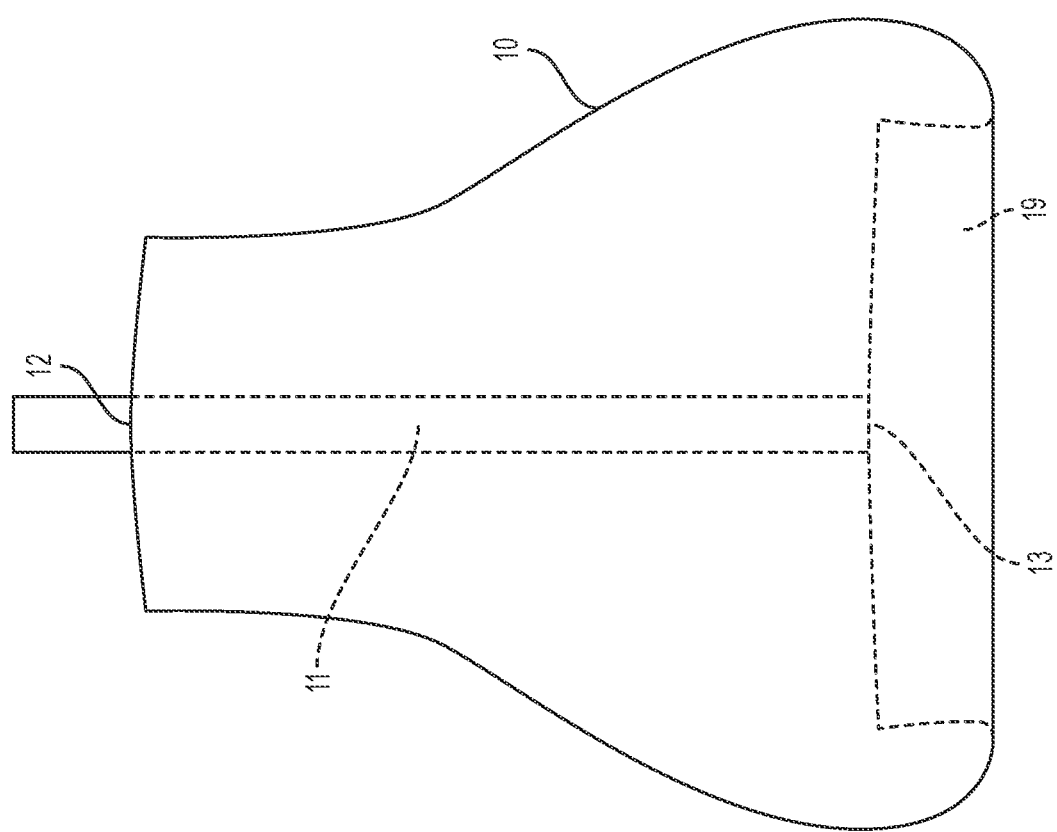
FIG. 12 shows a front view of a last with a sole pattern and an internal channel according to some embodiments.
Figure 13:
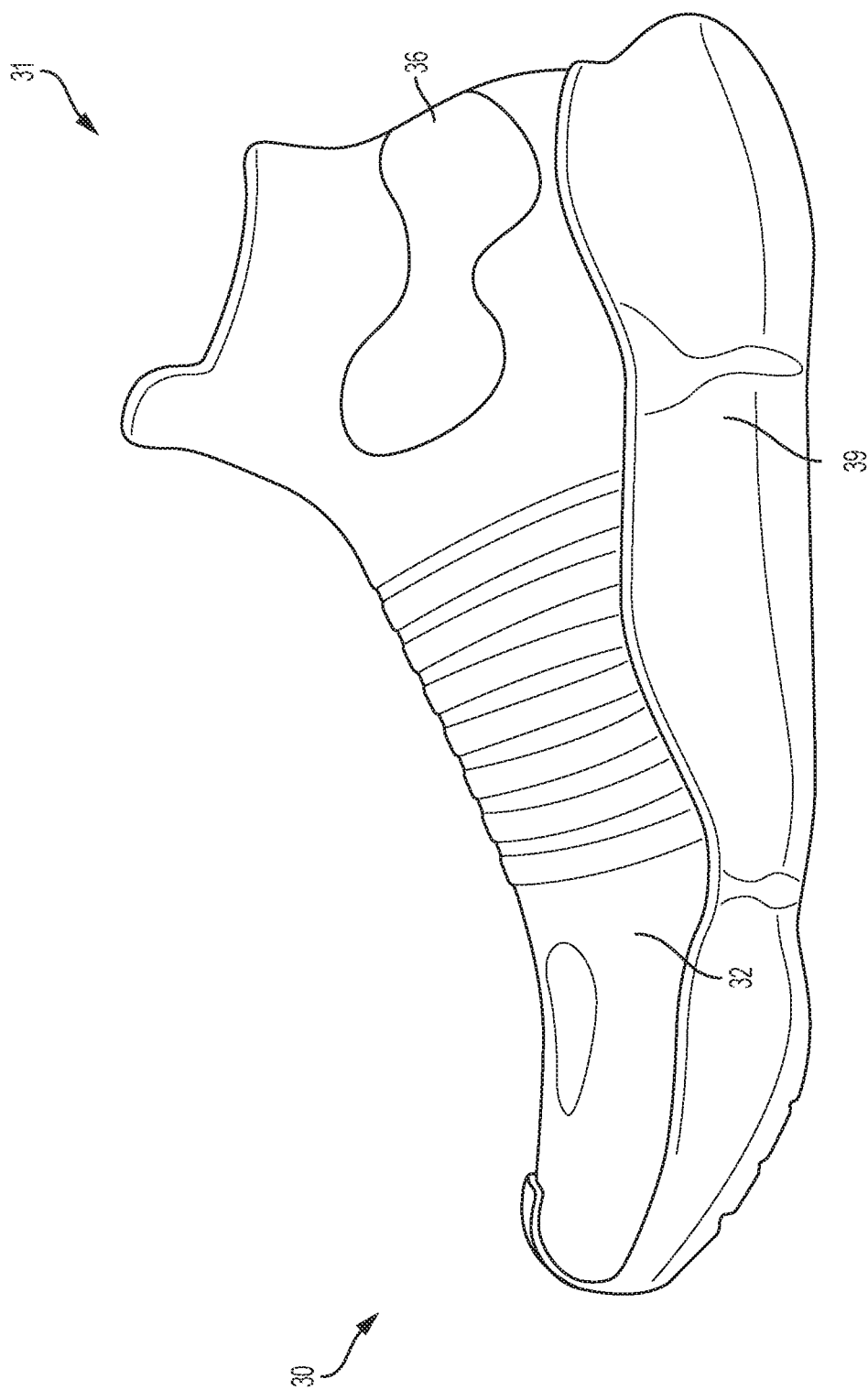
FIG. 13 shows a side view of an article of footwear according to some embodiments.

In some embodiments, a last 10, as shown, for example, in FIGS. 10-12, may be used to make a sole 39. Last 10 may include one or more inlet openings 12 and one or more outlet openings 13. In some embodiments, last 10 includes two inlet openings 12, each positioned on a top of last 10, for example, the portion of last 10 associated with an opening in an upper to receive a wearer's foot, as shown in FIG. 10. In some embodiments, last 10 includes two outlet openings 13 disposed on a bottom portion of last 10. In some embodiments, last 10 includes one or more channels 11 connecting inlet openings 12 to outlet openings 13. In some embodiments, last 10 includes two channels 11. As shown in FIG. 10, channels 11 are internal channels (indicated in dotted lines) disposed within last 10. In some embodiments, outlet openings 13 are disposed exactly underneath inlet openings 12 so that channels 11 are vertical when last 10 is upright.

In some embodiments, sole 39 comprises a midsole. In some embodiments, an upper is formed on last 10 (as described above for upper 31) and while the upper is still disposed on last 10, sole 39 may be formed. In some embodiments, polymeric material seeps through an upper (after moving through channels 11) to form sole 39.

In some embodiments, as shown in FIGS. 11 and 12, last 10 includes a sole pattern 19. In some embodiments, sole pattern 19 is disposed in a bottom portion of last 10. In some embodiments, sole pattern 19 comprises a cavity that extends most of the length of last 10 and most of the width of last 10. In some embodiments, sole pattern 19 may be used to form an insole. A base layer may be placed around last 10 (as discussed above with respect to upper 31). Then polymeric material may be moved through one or more channels 11 to fill in sole pattern 19 on an interior side of the base layer. As shown in FIGS. 11 and 12, channel 11 is an internal channel (indicated in dotted lines) disposed within last 10. The resulting upper with an embedded insole may be removed for incorporation into an article of footwear.

An article of footwear 30 made with last 10 (as described above) is shown, for example, in FIG. 13. Article of footwear 30 includes upper 31 and sole 39. In some embodiments, upper 31 includes base layer 32 and one or more footwear components. The footwear components may be internal or external components, including the components described above, as well as other components made with the methods described above. For example, in FIG. 13, upper 31 includes an internal ankle padding 36. In some embodiments, ankle padding 36 and midsole 39 are formed with a single injection of polymeric material through last 10. Thus, ankle padding 36 and sole 39 may be a single-injection midsole and padding disposed on upper 31. The single-injection midsole and padding may be distinct from upper 31.

Figure 14:
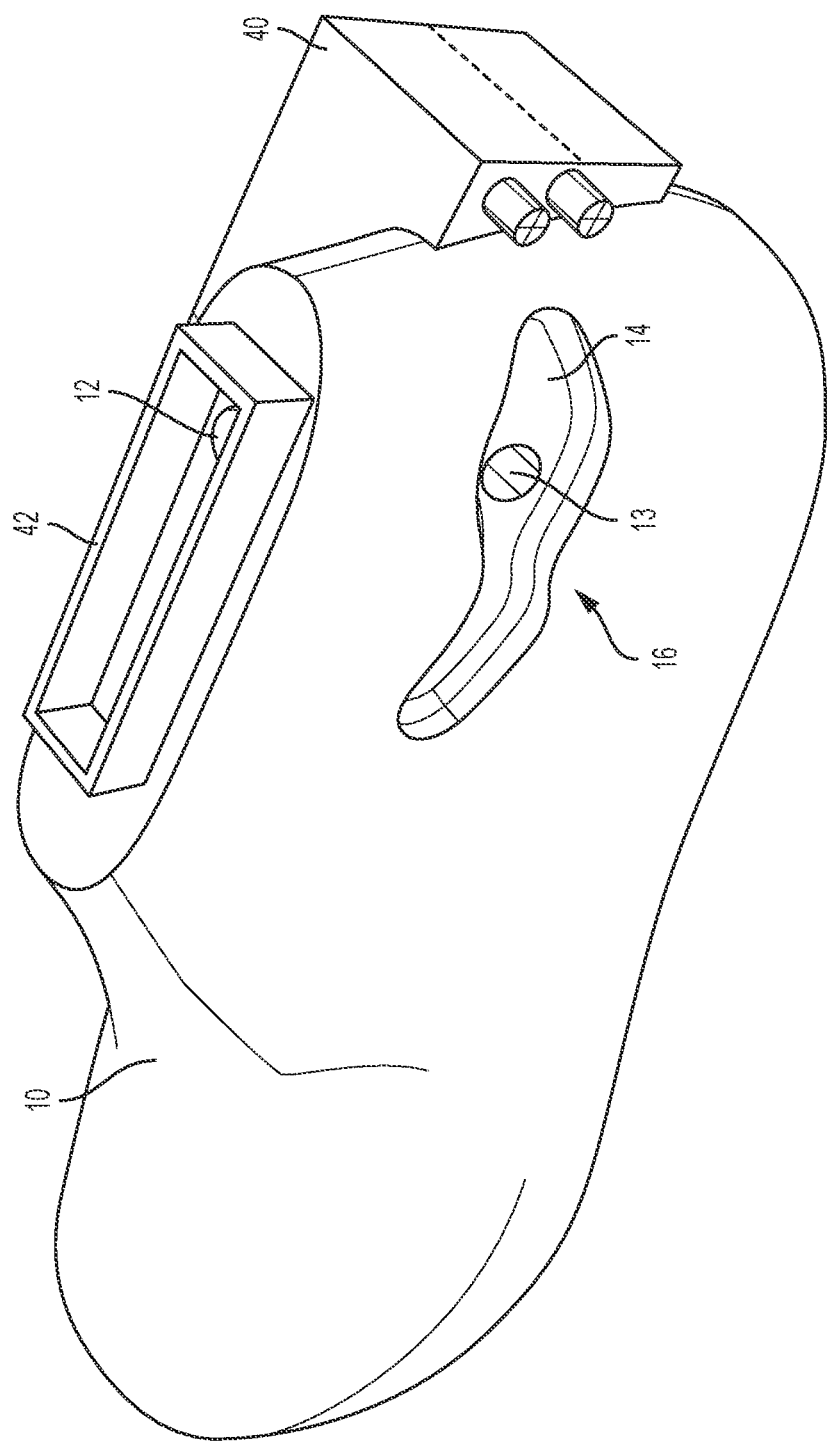
FIG. 14 shows a perspective view of a last with a modular attachment according to some embodiments.

In some embodiments, to help form the footwear components with the polymeric material injected through last 10, modular attachments are used. For example, as shown in FIG. 14, modular attachment 40 may help form ankle padding 36 with ankle padding pattern 16. In some embodiments, modular attachment 40 interfaces with an outer surface of last 10. For example, an inner surface of modular attachment 40 may correspond in shape to an outer surface of last 10. In some embodiments, base layer 32 is disposed between last 10 and modular attachment 40. In some embodiments, modular attachment 40 helps prevent polymeric material from seeping through base layer 32 to better form an interior footwear component.

Modular attachments may be various shapes and sizes to allow for greater customization to a particular wearer. The shape and size of modular attachments may depend on the location of the footwear component being created. The modular attachments may be used to adjust the level of padding for a particular footwear component.

In some embodiments, modular attachment 40 may include features (e.g., cavities or recesses) on its interior surface. In some embodiments, this configuration facilitates forming external footwear components. For example, the polymeric material may seep through base layer 32 and fill in the cavity or recess on modular attachment 40. The shape of the cavity or recess shapes the external footwear component into the desired shape.

In some embodiments, multiple modular attachments 40 are used. For example, two modular attachments 40 may attach to each other to surround last 10 during the injection process to help form footwear components. In some embodiments, a modular attachment may be disposed between last 10 and base layer 32.

In some embodiments, modular attachments are used to divert and/or channel polymeric material to and from desired regions on last 10. In some embodiments, modular attachment 40 may include channels. For example, polymeric material may be injected through modular attachment 40 to form footwear components.

Figure 15:
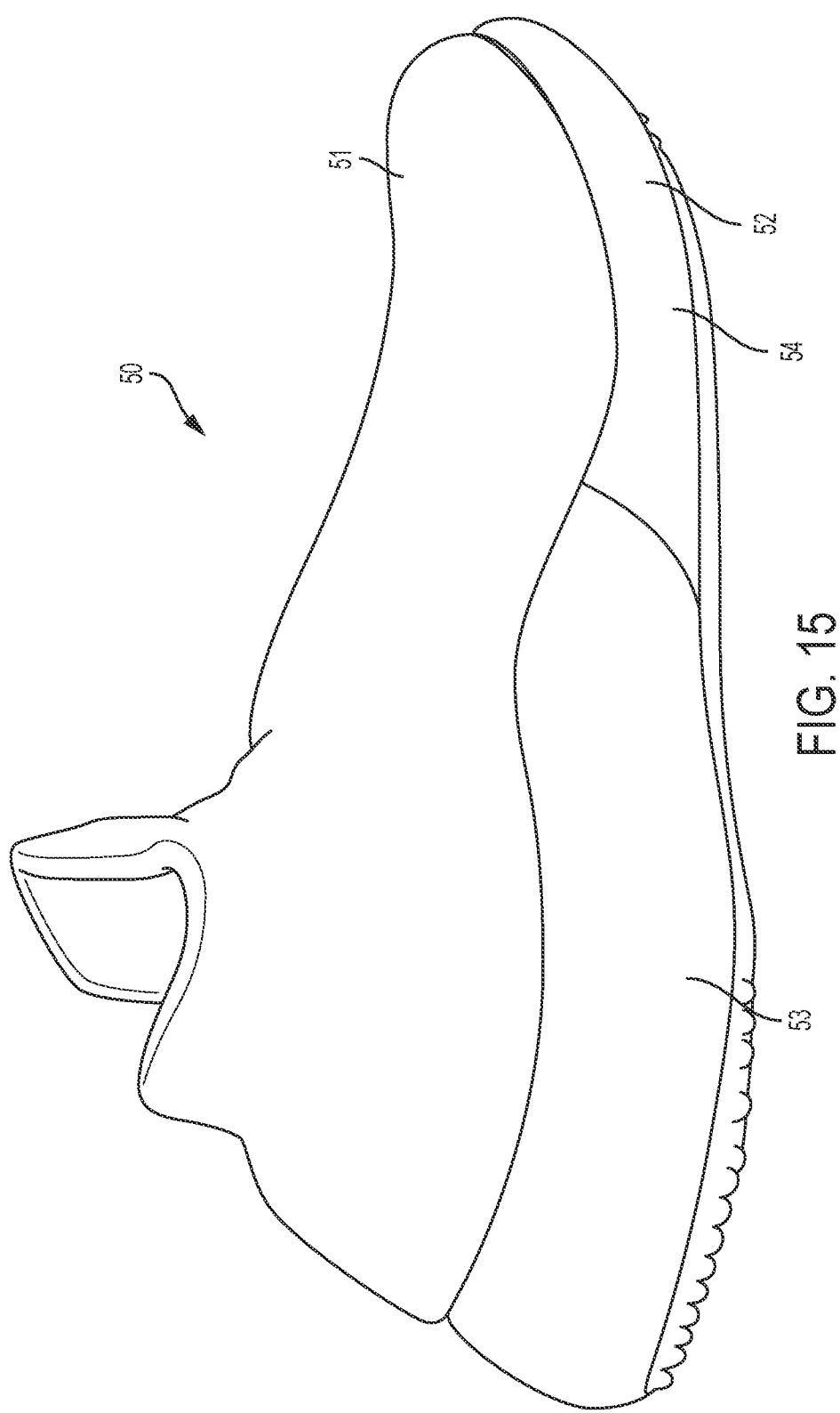
FIG. 15 shows a side view of an article of footwear according to some embodiments.

In some embodiments, an article of footwear 50 may be made with a sole 52 having dual density, as shown, for example, in FIG. 15. For example, sole 52 may be made up of a first density material 53 and a second density material 54. In some embodiments, first density material 53 and second density material 54 are injected through last 10 sequentially (in either order). In some embodiments, first density material 53 and second density material 54 are injected simultaneously.

In some embodiments, the configuration of the last 10 facilitates a dual density sole 52. For example, last 10 may include a first opening with a channel directed to an outlet in the heel portion of the last and a second opening with a channel directed to an outlet in the forefoot portion of the last. Different materials may be directed through each channel to form a dual density sole 52. In some embodiments, different materials may be directed through a single channel to form a dual density sole 52.

Creating a dual density sole 52 (or a sole with more than dual density) facilitates customization of article of footwear 50 to a particular wearer.

Figure 16:
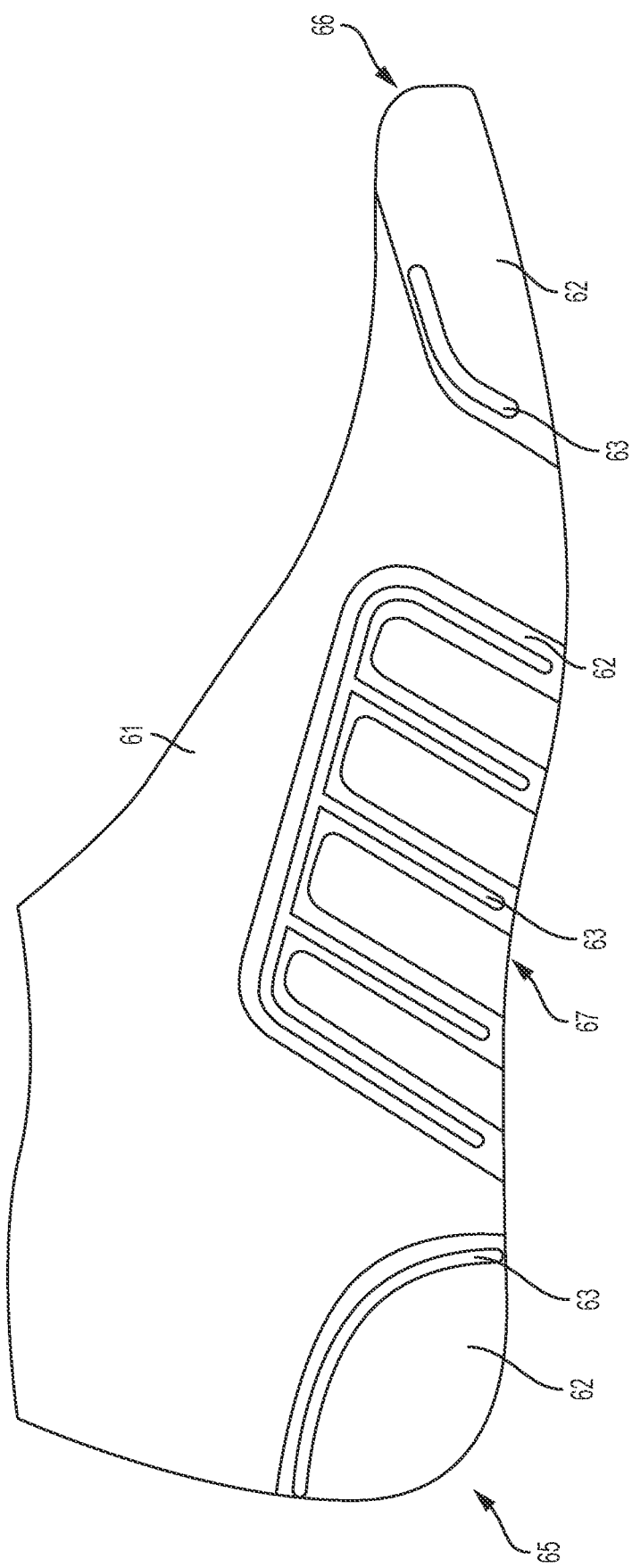
FIG. 16 shows a side view of an upper according to some embodiments.

In some embodiments, other components may be made of more than one material, as shown, for example, in FIG. 16. In some embodiments, an upper 61 includes a heel component 65, toe component 66, and midfoot support cage 67. Heel component 65, toe component 66, and midfoot support cage 67 may each be formed with material injected through last 10, as described above with respect to other components. In some embodiments, heel component 65, toe component 66, and midfoot support cage 67 each have dual density. For example, heel component 65, toe component 66, and midfoot support cage 67 may be made up of a first density material 62 and a second density material 63. In some embodiments, first density material 62 and second density material 63 are injected through last 10 sequentially (in either order). In some embodiments, first density material 62 and second density material 63 are injected simultaneously.

Various embodiments described herein provide improved footwear manufacturing that allows for shaping footwear components in an efficient, customizable, and fast manner. Internal and/or external footwear components for comfort, support, fit, stiffness, flexibility, and/or haptic feedback may be created directly on an upper. These components may be precisely formed in a customized manner by injecting a material through a last having an internal network of passageways (e.g., inlets, channels, and outlets) to various areas of the upper. The last may include engraved and/or embossed features on its outer surface to form the footwear components. In some embodiments, modular attachments may be used to assist in the formation of the footwear components. Other variations are also possible. For example, instead of a last, a similar foot form or shaping tool may be utilized to form footwear components in a similar manner.

In a further embodiment, a method of manufacturing an article of footwear, the method comprising positioning an upper on a last, the last defining openings connected by one or more channels in the last, injecting a material through the one or more channels in the last, and forming a structure on the upper with the material.

In a further embodiment, the structure comprises a midsole.

In a further embodiment, the structure comprises upper padding.

In a further embodiment, the openings comprise an inlet at a top of the last and an outlet at a bottom of the last.

In a further embodiment, the method further comprising customizing the structure based on data associated with a wearer.

In a further embodiment, the last defines a cavity at a bottom portion of the last.

In a further embodiment, the cavity extends most of the length of the last and most of the width of the last.

In a further embodiment, forming the structure on the upper comprises forming an insole in the cavity.

In a further embodiment, the last comprises a pattern with at least one of engraved features and embossed features.

In a further embodiment, a method of manufacturing an article of footwear, the method comprising positioning an upper on a last, injecting a material through the last, and forming upper padding and a midsole with the material in a single, continuous process.

In a further embodiment, the method further comprising injecting a second material through the last.

In a further embodiment, the method further comprising using a modular attachment to shape the upper padding.

In a further embodiment, the method further comprising obtaining foot data associated with a wearer.

In a further embodiment, the method further comprising using the foot data associated with the wearer to customize the midsole and the upper padding.

In a further embodiment, an article of footwear comprising an upper and a single-injection midsole and padding disposed on the upper, wherein the single-injection midsole and padding is distinct from the upper.

In a further embodiment, the padding is disposed on an outside of the upper.

In a further embodiment, the padding is disposed on an inside of the upper.

In a further embodiment, the padding is customized based on foot data associated with a wearer.

In a further embodiment, the midsole comprises multiple materials.

In a further embodiment, the midsole comprises a multi-density material.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method of manufacturing an article of footwear, the method comprising:
    positioning an upper on a last, the last defining openings connected by one or more channels in the last;
    injecting a material through the one or more channels in the last; and
    forming a structure on the upper with the material,
    wherein the structure comprises upper padding.

2. The method of claim 1, wherein the structure comprises a midsole.

3. The method of claim 1, wherein the openings comprise an inlet at a top of the last and an outlet at a bottom of the last.

4. The method of claim 1, further comprising customizing the structure based on data associated with a wearer.

5. The method of claim 1, wherein the last defines a cavity at a bottom portion of the last.

6. The method of claim 5, wherein the cavity extends most of the length of the last and most of the width of the last.

7. The method of claim 6, wherein forming the structure on the upper comprises forming an insole in the cavity.

8. The method of claim 1, wherein the last comprises a pattern with at least one of engraved features and embossed features.

9. A method of manufacturing an article of footwear, the method comprising:
   positioning an upper on a last;
   injecting a material through the last; and
   forming upper padding and a midsole with the material in a single, continuous process.

10. The method of claim 9, further comprising injecting a second material through the last.

11. The method of claim 9, further comprising using a modular attachment to shape the upper padding.

12. The method of claim 9, further comprising obtaining foot data associated with a wearer.

13. The method of claim 12, further comprising using the foot data associated with the wearer to customize the midsole and the upper padding.

14. A method of manufacturing an article of footwear, the method comprising:
   positioning an upper on a last, the last defining openings connected by one or more channels in the last;
   injecting a material through the one or more channels in the last; and
   forming a structure on the upper with the material,
   wherein the last comprises a pattern with at least one of engraved features and embossed features.

15. The method of claim 14, wherein the structure comprises upper padding.

16. The method of claim 14, wherein the structure comprises a midsole.

17. The method of claim 14, wherein the openings comprise an inlet at a top of the last and an outlet at a bottom of the last.

18. The method of claim 14, wherein the pattern comprises engraved features and embossed features.

19. The method of claim 14, further comprising obtaining foot data associated with a wearer.

20. The method of claim 19, further comprising using the foot data associated with the wearer to customize the structure.

* * * * *